United States Patent [19]

White

[11] 3,901,597

[45] Aug. 26, 1975

[54] LASER DISTANCE MEASURING DEVICE
[75] Inventor: Matthew B. White, Cohasset, Mass.
[73] Assignee: Philco-Ford Corporation, Blue Bell, Pa.
[22] Filed: Sept. 13, 1973
[21] Appl. No.: 396,802

[52] U.S. Cl. .................. 356/4; 356/5; 356/123; 356/167; 331/94.5 A
[51] Int. Cl............................................. G01c 3/08
[58] Field of Search ........... 356/4, 5, 167, 123, 109, 356/120; 331/94.5 A, 94.5 C; 250/201

[56] References Cited
UNITED STATES PATENTS

| | | | |
|---|---|---|---|
| 3,395,608 | 8/1968 | Neill | 356/109 |
| 3,409,370 | 11/1968 | King et al. | 356/28 |
| 3,530,402 | 9/1970 | Doyle et al. | 331/94.5 S |
| 3,555,280 | 1/1971 | Richards, Jr. | 250/201 |
| 3,567,320 | 3/1971 | Chitayat | 356/4 |
| 3,601,491 | 8/1971 | Vaniz | 356/106 R |
| 3,715,165 | 2/1973 | Smith | 356/167 |
| 3,733,129 | 5/1973 | Bridges | 356/5 |
| 3,768,910 | 10/1973 | Zanoni | 356/5 |

Primary Examiner—Maynard R. Wilbur
Assistant Examiner—S. C. Buczinski
Attorney, Agent, or Firm—Robert D. Sanborn

[57] ABSTRACT

When a diffusely reflecting surface, such as the kind ordinarily encountered on most physical objects, is located in the focal saddle of a lens, the combination produces reflection that has spatial coherence characteristics similar to those obtained from a specular surface. Such a combination can be employed in conjunction with a conventional mirror to provide a low-Q Fabry-Perot resonant cavity. A high gain laser medium can produce oscillation with such a low-Q resonator. When the diffuse surface is outside the lens focal saddle the cavity Q is too low and laser action will not occur. As the focal saddle is advanced toward the surface, the cavity Q will increase and the onset of laser oscillation will signal contact between the focal saddle and the surface. This contact position is repeatable to high precision and is therefore a useful distance measurement. In one alternative embodiment the active laser medium is not contained within the low-Q cavity but instead the low-Q cavity is optically coupled to a conventional laser and its optical length modulated at a convenient frequency. If the laser output is examined for modulation components at the cavity modulation frequency, contact between the focal saddle and the diffuse surface can be established by their presence. In a second alternative embodiment the low-Q cavity includes a quarter-wave plate and is optically coupled to a dual polarization laser having greater than critical adjacent mode coupling. Such a laser will oscillate in only one mode at a time but two orthogonal polarization states are permitted. When the low-Q cavity is operative, that is, when the diffuse surface is inside the lens focal saddle, moving the surface relative to the lens will cause the laser polarization state to flip for each quarter wave length of motion. Thus if the laser polarization state is monitored, entry of the surface into the focal saddle can be sensed by the onset of polarization flipping and motion inside the focal saddle can be established by counting the number of flips.

9 Claims, 8 Drawing Figures

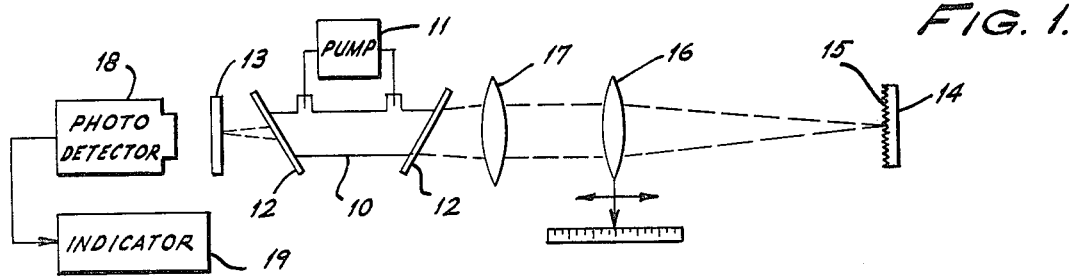
FIG. 1.
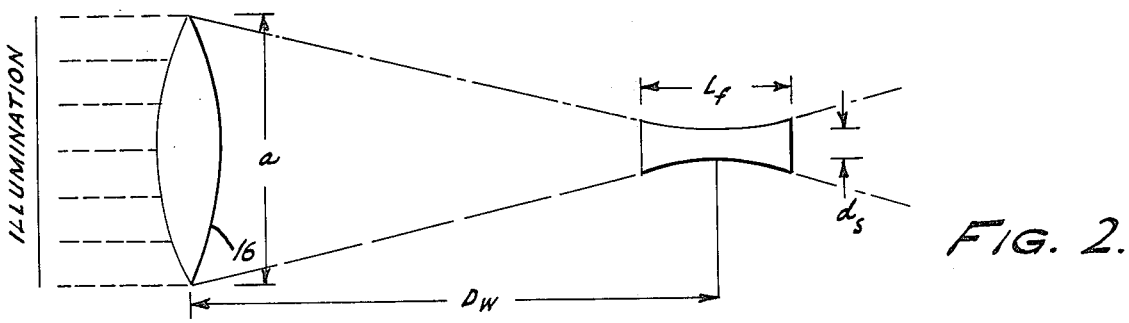
FIG. 2.
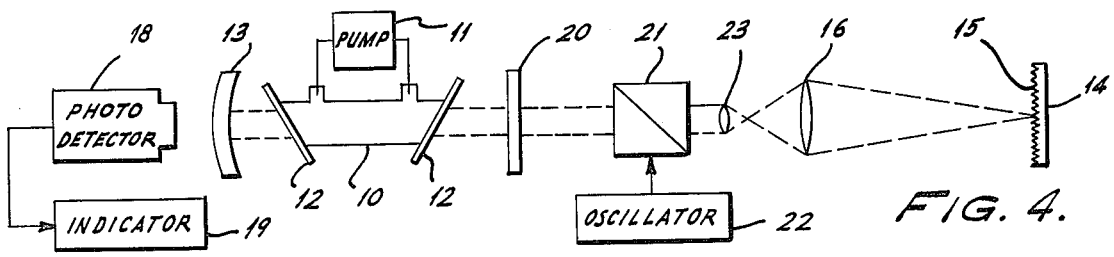
FIG. 4.
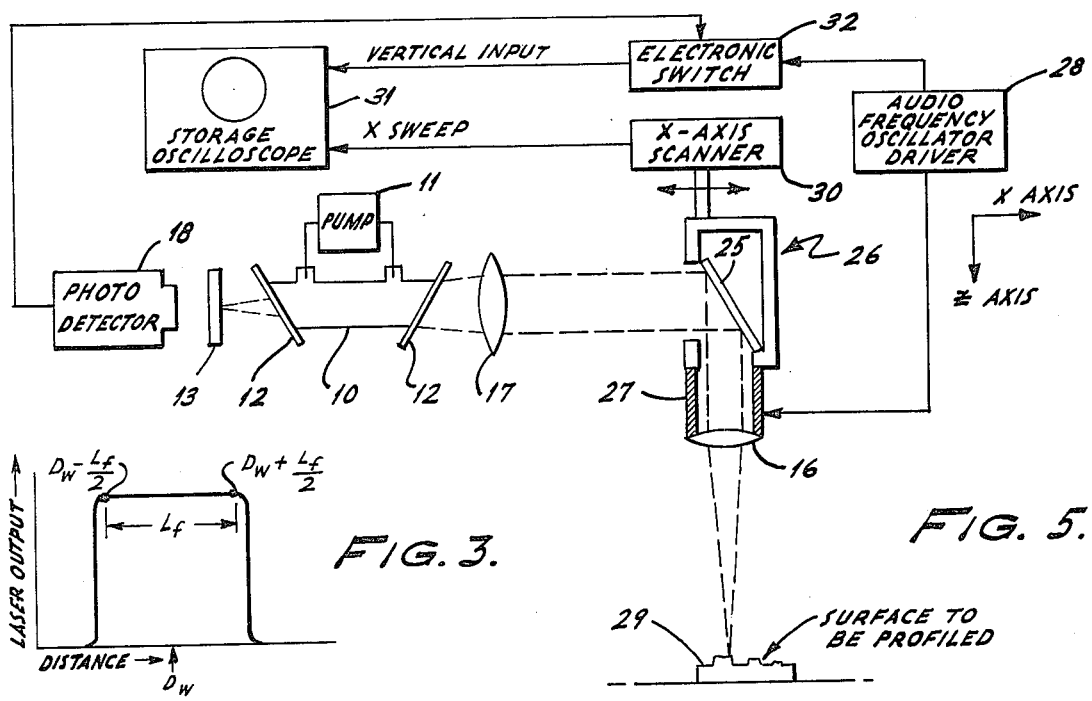
FIG. 3.
FIG. 5.

LASER DISTANCE MEASURING DEVICE

BACKGROUND OF THE INVENTION

Distance measurements have been developed using a great variety of techniques and it has long been realized that the optical probe provides a very useful non-contacting measurement. One of the most widely used optical methods is the binocular or split image method but this lacks precision. The interferometric method results in great precision provided that adequate fringe counting is available but this requires an oriented flat specular measurement surface or a retroflector mounted on the surface to be measured. Time of flight techniques (such as optical radar or lidar) have proven quite accurate and useful, but at short ranges the narrow pulses and short echo times make the measurement difficult. At best such equipment is quite complicated. It would be very desirable to use a simple optical probe technique having good accuracy and capable of short range measurements or irregular diffuse surface objects that may not be stationary.

SUMMARY OF THE INVENTION

It is an object of the invention to provide an optical device to measure the distance to a diffuse surface without mechanical contact.

It is a further object to employ optical contact between a diffuse surface and the focal saddle of a lens to provide a precise measure of distance.

It is a still further object to employ the reflections from a diffuse surface inside the focal saddle of a lens in conjunction with the reflection from a specular mirror to produce a low-Q optical resonator.

It is a still further object to employ the low-Q resonator produced by the action of a specular mirror in conjunction with a lens and diffuse surface in a laser system wherein the occurrence and nature of the laser output is used to indicate when the diffuse surface is located inside the lens focal saddle. These and other objects are accomplished in the following manner. A distance measurement is based on the spacing between a lens and its focal saddle. When an ordinary object having a diffuse surface is located so that the surface lies within the focal saddle of a lens, the combination produces a reflection with coherence properties similar to those of the reflection produced by a specular mirror. When combined with a conventional mirror, the lens/diffuse reflector combination can be used to provide a low-Q Fabry-Perot resonant cavity. If the surface is caused to pass through the focal saddle by means of relative motion, a plot of cavity Q versus distance yields a function that rises sharply with entry into the focal saddle and drops sharply upon exit. Accordingly, the value of cavity Q can be used as a distance measuring discriminant that yields a high degree of precision. Also it is possible to use the occurrence of maximum Q as an indication that the surface is at the center of the focal saddle.

In one embodiment the low-Q cavity is used with a high gain laser medium to form a laser that oscillates only when the diffuse surface is inside the lens focal saddle. In this embodiment, the onset of laser oscillation is used to indicate when the focal saddle is in contact with the object. Maximum oscillation amplitude indicates that the cavity Q is maximum and the surface is at the center of the focal saddle.

In a second embodiment the low Q-cavity is optically coupled to a conventional oscillating laser and a phase (i.e. optical path) modulator is incorporated inside the low-Q cavity. When the diffuse surface is located inside the focal saddle, and the cavity Q is near maximum, the laser output will contain modulation products at the frequency of the phase modulation. Thus focal saddle contact with the object can be detected by the presence of the phase modulator frequency in the modulation products of the laser output.

In a third embodiment, the low-Q cavity is optically coupled to a dual polarization laser and includes a quarter-wave retardation plate. If the dual-polarization laser is operated at greater than critical adjacent mode coupling, only one polarization will oscillate at a time. The particular polarization state that will oscillate at any given instant is determined by the optical lengths of the primary laser cavity and the low-Q cavity, $L_P$ and $L_{LQ}$, and the output polarization will switch from one preferred state to another each time $L_{LQ}$ changes by $\lambda/4$. Hence, as the length of the low-Q cavity is monotonically changed by passing the diffuse surface through the lens focal saddle, the polarization state will flip for each quarter wavelength of motion. Thus not only will the onset of the polarization flipping yield information on the entry of the diffuse surface into the focal saddle, counting the number of flips will yield precise (to one quarter wave length) information on the motion during passage.

BRIEF DESCRIPTION OF THE DRAWING

FIG. 1 shows a basic distance measuring device employing a high gain laser medium;

FIG. 2 is an illustration of the geometry of the focal saddle of a focusing lens;

FIG. 3 is a graph showing the output of the laser of FIG. 1 as a function of the distance between the diffuse surfaces and the focusing lens;

FIG. 4 shows a distance measuring device employing a conventional laser medium;

FIG. 5 shows a profilometer based upon the principle of the device of FIG. 1;

DETAILED DESCRIPTION OF THE INVENTION

Figure 6:
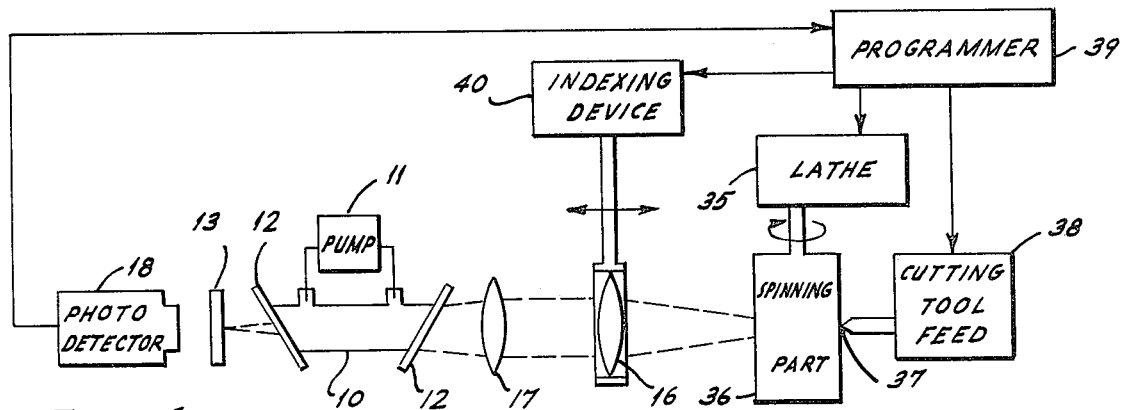
FIG. 6 shows a programmed lathe using the distance measuring device of FIG. 1.

FIG. 1 shows a laser oscillator in which one of the conventional cavity mirrors has been replaced by a diffusely reflecting surface and lens combination. Laser tube 10 contains an active medium, such as a mixture of helium and neon, excited by a plasma discharge activated by pump 11. The discharge tube is closed by Brewster-angle windows 12 in the conventional manner. Mirror 13 forms one end of the optical resonant cavity while reflector 14 constitutes the other end of the cavity. It has been found that when a diffuse surface is located near the focus of a suitable lens, the combination of diffuse surface and lens affords sufficient reflectivity to permit laser oscillation in a high gain laser system. Such a resonant cavity is said to have low-Q. The gain of a helium-neon laser for the 3.4 micron transition is adequate for such operation. Laser cavity end plate 14 having a diffuse reflection surface 15 is located near the focus of lens 16. Lens 17, which has its focus located at mirror 13, collimates the light impinging on lens 16. Lens 17 can be omitted if mirror 13 is located at the focus of lens 16 but is useful if lens 16 is to be axially translatable as will be described hereinafter.

The laser will oscillate only if surface 15 is sufficiently close to the focus of lens 16. The optical resonant cavity will have minimum loss when surface is exactly at the focus of lens 16 and the loss will increase as the surface location departs from this condition. Clearly, there will be a maximum tolerated departure. Inside these limits laser oscillation will be sustained.

FIG. 2 illustrates the geometry of the related optics. Parallel illumination rays impinging on lens 16 will be brought to a focus at $D_w$, the focal length of the lens. The diffraction limited minimum focus diameter, $d_s$, is related to the lens focal length and aperture, a, as follows:

$$d_s \text{ (mils)} \approx \frac{0.1 D_w}{a} (\lambda = 1.15 \text{ microns}) \quad (1)$$

The length over which the diffuse surface can be moved without incurring excessive cavity loss is referred to as $L_f$. The spatial region of lens focus bounded by the $L_f$ limits, is called the focal saddle. The focal saddle is related to the lens characteristics as follows:

$$L_{f \text{ (cm)}} \approx 6 \times 10^{-4} \left(\frac{D_w}{a}\right)^2 \quad (\lambda\ 1.15 \text{ microns}) \quad (2)$$

The numbers used in equations (1) and (4) are indicated for a laser operating at 1.15 microns, and are proportional to laser wavelength.

FIG. 3 is a graph showing the output of the laser of FIG. 1 as a function of the distance of surface 15 from lens 16. At distance $D_w$ normal laser oscillation occurs and the output is saturated. As the surface departs from $D_w$, the end of the focal saddle is reached when the laser output starts to drop at the points labeled $$D_w - \frac{L_f}{2} \text{ and } D_w + \frac{L_f}{2}.$$

As the focal saddle is exceeded, the laser output rapidly drops to zero. In a typical system, the laser output will reach zero in an interval substantially less than $L_f/10$.

In the device of FIG. 1 the basic distance measurement is made as follows: Mirror 13 is made slightly transmissive so that when the laser oscillates photo detector 18 will be excited and the signal will appear on indicator 19. Thus if surface 15 starts out at a point beyond the far end of the focal saddle and is caused to move toward the laser, the output of photo detector 18 produces a response like that of FIG. 3. If indicator 19 includes a threshold circuit designed to indicate a predetermined laser output value, the indicator will precisely indicate when surface 15 has arrived at one of two points which lie symetrically on either side of the focal saddle center lens 16. The exact distances will be partly determined by the threshold value of indicator 19, but the average value will be repeatable to high precision. Thus the device of FIG. 1 can be used as a means for a precise non-contact distance measurement to a diffuse surface.

Since lens 17 is focused on mirror 13 its optical output will be collimated. This permits lens 16 to be moved along the beam axis with respect to the remainder of the laser without disturbing laser operation. Therefore only lens 16 need be moved in the distance measuring operation, and it can be provided with a calibrated scale if desired.

FIG. 4 shows a continuously oscillating distance measuring device. This device does not require a high gain laser as did the one in FIG. 1. A helium-neon laser operating at 1.15 microns has proven satisfactory. Laser tube 10 with its pump 11 and Brewster-angle windows 12 comprises the active medium. Partly transmissive mirrors 13 and 20 make up the laser resonator. The output from mirror 20 is passed through an electro-optical phase modulator 21 driven by oscillator 22. Lens 23 serves to expand the beam so as to provide illumination of the full aperture of focusing lens 16. When diffuse surface 15 of object 14 is in the focal saddle of lens 16, the combination will reflect substantial energy back into the laser. In effect mirror 20 will, in conjunction with surface 15, act as a low-Q resonator as long as surface 15 is in the lens focal saddle. This second or low-Q resonator is coupled to the laser by means of the transmissivity of mirror 20. Modulator 21 phase modulates the energy in the second, or coupled, low-Q resonator at a rate determined by oscillator 22. Thus the energy coupled back into the laser is phase modulated and this will amplitude modulate the laser. Indicator 19 connected to photo detector 18 is tuned to the frequency of oscillator 22 and therefore it will indicate when surface 15 is inside the focal saddle of lens 16.

FIG. 5 shows a profiling embodiment of the invention using the basic device of FIG. 1. The laser tube 10, pump 11, and end windows 12 are as described in connection with FIG. 1. Collimating lens 17 applies parallel rays to focusing lens 16 by way of 45° mirror 25. Lens 16 is mounted on optical probe by means of a piezoelectric tranducer 27. When driven electrically by an audio frequency oscillator 28, transducer 27 will move lens 16 along the laser optical axis. This is designated the Z axis in the drawing. Sufficient drive is applied so that the excursions of lens 16 exceed the maximum Z-axis deviations of the surface of object 29. The optical probe is driven horizontally by means of a mechanical X-axis scanner 30 which causes the optical probe to move over a sufficient distance to traverse object 29. The X-axis scanner also provides electrical input to the X-axis sweep of storage oscilloscope 31. The vertical oscilloscope input is obtained from an electronic switch 32 that is actuated by the signal from photo detector 18.

In operation, lens 16 is vibrated at an amplitude sufficient to cause the focal saddle of lens 16 to traverse the maximum vertical profile of object 29. The optical probe is located so that when lens 16 is at its uppermost location the focal saddle will just clear the highest reaches of object 29. For this condition the laser will not oscillate. As lens 16 is driven downward, the focal saddle will encounter the diffuse surface and the laser will start to oscillate and therefore illuminate photodetector 18. The photo detector output will activate switch 32 and allow energy from oscillator 28 to deflect oscilloscope 31. The amount of deflection is related therefore to the height of the surface. Thus as optical probe 26 is translated horizontally and various levels of object 29 are encountered by the oscillating focal saddle, the oscilloscope will trace out a vertical display of the surface. By appropriate adjustment in the gain or loss in the circuits (including switch 32) between oscillator 28 and the vertical input terminals of oscilloscope 31, a slight variation in the surface of object 29 will appear on the oscilloscope greatly enlarged.

As a further refinement, a Y-axis scanner can be added to the system - for example by moving object 29 along the system Y-axis which would be perpendicular to the plane of the drawing. As analog of this motion is applied to the oscilloscope by way of Y-axis deflection (not shown). Thus the X-Y translations would appear on the oscilloscope face as X-Y coordinates. The profile would appear as a relief image of the surface due to the Y-axis display of profile. If desired the output of switch 32 could be used to intensity modulate oscilloscope 31 and the X-Y coordinates translated directly to oscilloscope coordinates. Here the surface profile would appear as brightness contours.

The system of FIG. 5 is operable because of the parallel light beams between lenses 16 and 17. As has already been described in detail with reference to FIG. 1, this permits the separation between lenses to vary without changing laser oscillation. Alternatively, the effects of motion of the optical probe could be minimized by mounting the laser tube 10, mirror 13 photo detector 18 and lens 17 on the optical probe 26 thereby making a unitary optical assembly. For this configuration both X and Y axis motions could be applied to the optical probe itself.

FIG. 6 shows the distance measuring device applied to a programmed lathe. Lathe 35 causes part 36 to spin while cutting tool 37 is advanced against the part by feed 38. The system is controlled by programmer 39. Indexing device 40 positions lens 16 so that the starting diameter of part 36 is inside the laser tube end of the focal saddle and the laser will not oscillate. The programmer 39 causes the cutting tool 37 to advance against part 36 thereby reducing it diameter. When the diameter is reduced to where the surface enters the focal saddle, the laser will start to oscillate, photo detector 18 will apply a signal to the programmer 39 and the latter will then halt tool feed. The programmer then advances part 36 to a new position, sets indexing device 40 for the desired part diameter and continues marching on a new cycle as outlined above. This action permits machining a part to high tolerance without any measurement device in physical contact with the part being machined.

Figure 7:
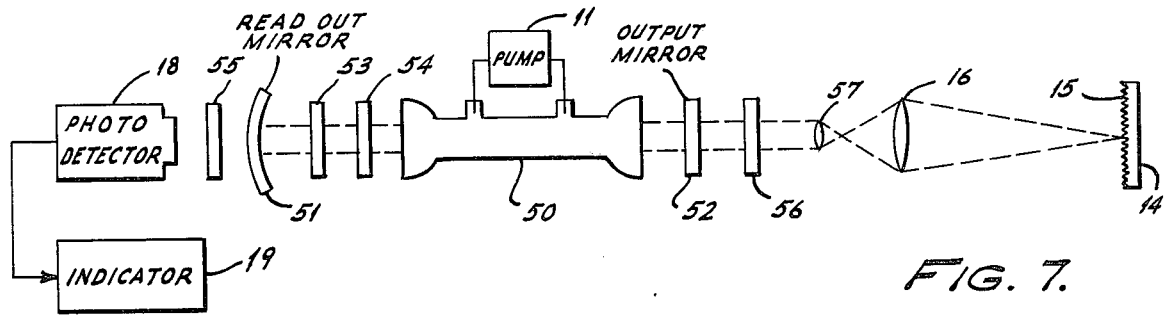
FIG. 7 shows a distance measuring device employing a dual polarization laser.

FIG. 7 shows a dual-polarization laser adapted for use as a distance measuring device. Laser tube 50, which appropriately may contain helium-neon as the active material and operate using the 1.15 micron transition, is energized by pump 11. The laser tube is configured with slightly non-parallel end windows so as to discourage window-induced resonator action while not favoring any particular polarization direction. The laser cavity is bonded at one end by partly transmissive mirror 51 which operates as a read out device, and partly transmissive mirror 52 which acts as the laser signal output device. A linear birefringence element 53 and a circularly birefringent element 54 are located inside the laser resonator. These elements act to confine laser oscillatory modes to polarization states that are mutually orthogonal. All other polarization states will be rejected because they will not produce stationary standing waves and will therefore not be reinforced by laser resonator action. Since the optical length of the laser cavity is different for the allowed orthogonally polarized modes adjacent laser modes are orthogonal and operate at slightly different frequencies. By adjusting the relative birefringent strengths of elements 53 and 54, adjacent mode coupling is increased to the so-called "strong" domain, where only one mode can operate at a time because the oscillating mode extracts energy from the orthogonal mode thereby suppressing it.

The action of strong coupling between adjacent modes and the control of such coupling be adding a circular birefringence element to a dual-polarization laser is taught in U.S. Pat. No. 3,530,402.

Polarizer 55 is oriented parallel to the major axis of one of the, in general eliptically polarized, orthogonal laser modes so that photo detector 18 will produce maximum output when this mode is oscillating. The output of the laser for the orthogonal mode will be mostly blocked by polarizer 55. Accordingly a change in the output of photo detector 18 will signal a change of laser oscillation polarization.

A quarter-wave retardation plate 56 is located adjacent to laser output mirror 52 and a small-aperture lens 57 expands the beam so as to illuminate the full aperature of focusing lens 16. When diffuse surface 15 of object 14 is in the focal saddle of lens 16 a substantial fraction of the laser output will be reflected back into the laser by way of partly transmissive mirror 52. Quarter wave plate 56 is oriented with its optical axis at 45° with respect to the principal axes of the laser allowed polarization states. This means that if the laser is oscillating in one mode, radiation reflected back into the laser cavity from surface 15 by way of plate 56 will have the polarization state of the orthogonal mode and, if its phase is correct, will tend to drive that mode into oscillation. Hence, if the back reflected radiation is strong enough, the laser oscillation will flip from one mode to the other each time the phase of the reflected radiation is changed by 180° (i.e. the diffuse surface is moved by λ/4). As surface 15 is moved from outside the focal saddle into it, entry will be signaled by the onset of mode flipping and pulses from photo detector 18 will be shown on indicator 19. While surface 15 is passing through the focal saddle, each time the surface moves one quarter wavelength, the polarization state will change and be indicated by the photo detector indicator combination. For a focal saddle 5 mils long, a 1.15 micron laser will flip polarization about 434 times for one transit. This action provides two separate references. The ends of the focal saddle are sharply defined by the onset or cessation of polarization flipping while counting polarization flips will provide a precise measure of quarter wavelength intervals inside the focal saddle. Further, by noting the frequency of flipping, the rate of motion of the surface can be measured.

Figure 8:
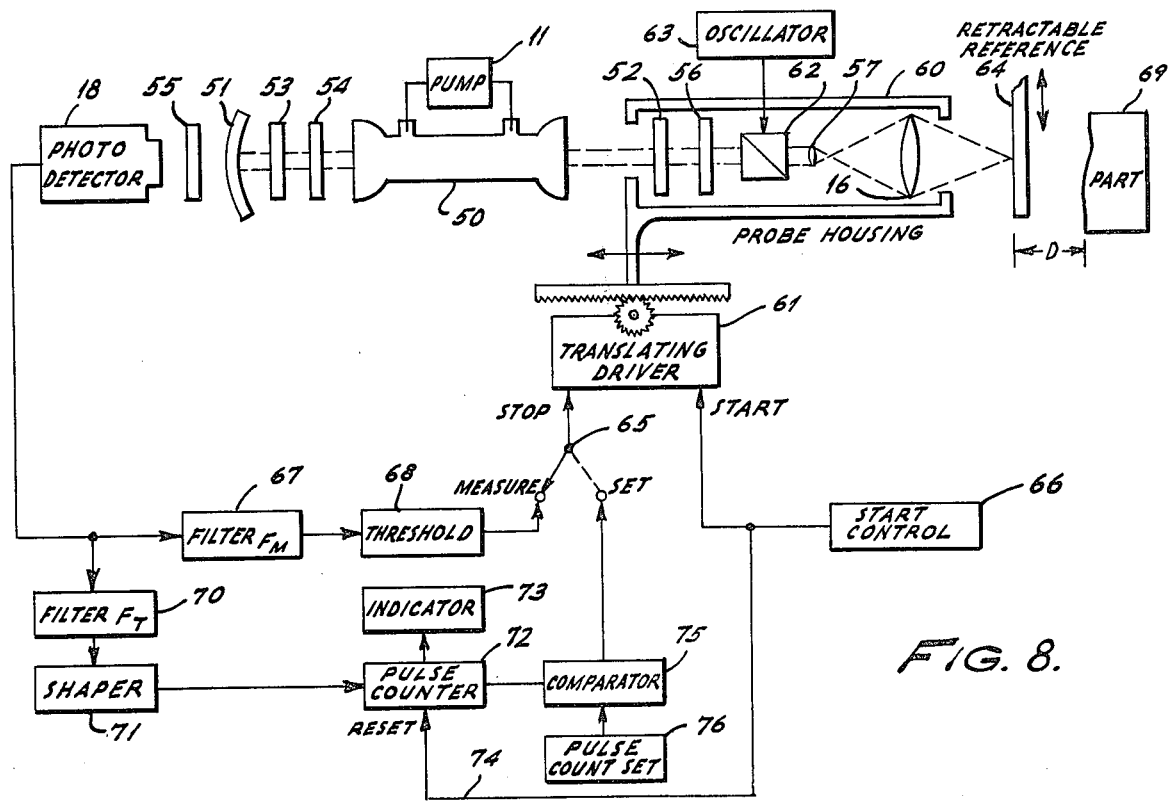
FIG. 8 shows a machine tool precision measurement system based upon the device of FIG. 7.

FIG. 8 illustrates how the polarization flipping of a dual polarization laser can be used in machine tool setup for precision measurements. Laser tube 50, photo detector 18, polarizer 55, readout mirror 51, linear birefringence element 53, and circular birefringence element 54 are as was shown in FIG. 7. Laser cavity output mirror 52, quarter-wave plate 56 and lenses 57 and 16 are all mounted in an optical probe housing 60 which can be translated by driver 61 along the laser axis. The function of elements 52, 57 and 16 have already been described with reference to FIG. 7. Further reference to translating driver 61 and its physical nature will be made hereinafter. The laser system also contains an electro-optical phase modulator 62 which is driven by oscillator 63.

It can be seen that there are two means present for causing the laser polarization to flip. As driver 61 moves optical probe 60 through one quarter of a laser wavelength, the polarization will flip because the laser cavity is being varied. If driver 61 operates at constant speed, polarization flipping will occur at a rate of $4V_{Tl}$ or the translational velocity divided by one fourth laser wavelength. This frequency will be referred to as $F_T$.

The other source of polarization flipping will be due to reflections from a surface in the focal saddle of lens 16. Assuming that there is no translational motion and that a surface is present in the focal saddle, modulator 62, will, if driven sufficiently by oscillator 63, cause polarization flipping, because it varies the effective length of the low Q cavity that exists between the diffuse surface and mirror 52 by more than one quarter wavelenth. Since this electro-optically induced flipping is electronic in nature it can be operated at a frequency much higher than $F_T$ and is therefore distinguishable. The polarization flipping rate due to the action of modulator 62 will be referred to as $F_M$. Translating driver 61 is a constant-speed device that can be started and stopped by the application of suitable pulses to its control circuits. It is designed to advance optical probe 60 from left to right. The mechanical action is reset manually from right to left by means of a machanism not shown. Typically the heart of the driver will be a pulse-type motor and control circuits that apply a constant rate of pulses to the motor. The pulse application is through suitable gate circuitry whereby the motor can be started and stopped by applied control pulses. The motor is coupled to a suitable linear mechanical drive. A rack and pinion or worm and rack drive is commonly used. Such drive arrangements are well known in the art and will not be described in detail.

Assuming that probe 60 is at its extreme left hand position, a rectractable reference 64 is moved into its lower position as shown. With mode switch 65 in its MEASURE position, operation of the start control 66 will start driver 61 and the probe 60 is advanced to the right. As soon as the focal saddle of lens 16 encounters the surface of reference 64 the laser polarization will begin flipping at frequency $F_M$. A signal at frequency $F_M$ will be passed by filter 67 and applied to threshold circuit 68. The latter is constructed and arranged to generate a pulse in response to the applied signal, and to apply that pulse to driver 61 to terminate its forward motion. Thus when switch 65 is in the MEASURE position the probe will advance until it reaches a point in space determined by the lens focal saddle and this point can be made repeatable to high precision. To measure distance D from the reference surface to the surface of part 69, the reference is retracted and the start control 66 again actuated. Driver 61 will advance probe 60 until the lens focal saddle encounters the surface of part 69. At this point, polarization flipping at $F_M$ will occur and stop the driver as described above. During this latter translation action, while the focal saddle is moving over distance D, polarization flipping at frequency $F_T$ was occuring and this component of photo detector 18 output will be passed by filter 70. Shaper 71 sharpens the pulses which are then totaled in counter 72. Indicator 73 will display either the total number of counts (which value can be converted to distance D) or the actual distance traversed by probe 60.

Thus distance D can be measured to high precision without mechanical contact. The count will accurately portray distance D because each time start control 66 is actuated it resets counter 72 to zero by way of reset line 74.

When mode switch 65 is in the SET position, the driver stop action is obtained in a different manner. Assume first that driver 61 has advanced optical probe 60 until the focal saddle of lens 16 has contacted the surface of reference 64 in the MEASURE position as described above. Switch 65 is then moved to the SET position which invokes two additional devices. Comparator 75 receives information from counter 72 and is programmed by pulse count set 76. Pulse count set 76 will be adjusted by either a desired number of pulses or a desired distance depending upon how it is calibrated. It will program comparator 75 to produce an output pulse when a pre-determined number of input pulses has been received. When start control 66 is operated in the SET mode, driver 61 will run, thereby advancing probe 60, until the pulses passing through filter 70 ($F_T$) equal the number established by pulse count set 76. The pulse from comparator 75 will stop driver 61 at precisely the predetermined distance. It will be noted that operating start control 66 also resets counter 72 to zero by way of reset line 74. This means that indicator 73 will always read either the measured distance or the set distance that driver 61 advances probe 60.

EXAMPLE I

A helium-neon laser operating at 3.4 microns was set up as shown in FIG. 1. Different focal length lenses were employed at the position of lens 16. It was found that successful laser oscillation could be obtained with the spacing between lens 16 and surface 15 over ranges of a fraction of an inch to several yards. The precision was found to be on the order of 0.01 mil at 1 inch and about 0.24 mil at 10 inches. Thus precision depends upon the F number of lens 16, and is lower for larger F numbers. Successful measurements were obtained on surfaces composed of unpolished and machined metal, paper, wood, rubber, and clay as well as flat, concave, and convex mirror surfaces. Successful measurements were also made on rapidly moving surfaces such as motor shafts.

EXAMPLE II

A commercially available helium-neon laser tube operating at 1.15 microns was set up as shown in FIG. 4. Indicator 19 contained a narrow band filter tuned to the frequency of oscillator 22. It was found that the device could be operated while the laser oscillating cavity was varied over more than 8 inches. This established that the combination of mirror 20 modulator 21, lens 23, and lens 16 can be translated at least 8 inches as a unit relative to the rest of the laser.

It was found that when diffuse surface 15 was machined metal, it could be tilted as much as 10° without losing the probe contact signal. Less smooth surfaces could be tilted even further.

EXAMPLE III

A helium-neon dual-polarization laser operating at 1.15 microns was set up as shown in FIG. 7. Lens 16 had a 12 mm focal length and a 2 mm aperture. Polarization switching was observed over a ±3 mil range of surface 15. Polarization reversal was observed for each quarter wave length of motion. Surfaces of white paper, masking tape, black photographic tape, anodized aluminum, and unpolished plastic proved satisfactory. The more diffuse surfaces could be tilted to in excess of 45° and still produce an adequate probe contact signal. The maximum working distance of the dual polarization device is about 30 times the range of the device of FIG. 1.

The basic concept of the invention has been set forth, as well as several embodiments and applications. Numerous alternatives and equivalents will occur to a person skilled in the art. For example, while transmissive optics have been shown, reflective optics can be used where desired. Furthermore, while the dual polarization laser is shown as having both linear and circular birefringence elements inside the laser cavity, the circular birefringence element can be omitted for those laser materials, such as carbon dioxide, that have sufficient inherent adjacent mode coupling for linearly polarized modes. Where the laser active material is sensitive to an axial magnetic field, such a field can be used in place of the circular birefringerence element. It is intended that the scope of the invention be limited solely by the following claims:

I claim:

1. An optical system for use in measuring the distance between a part of said system and an object having a non-specular reflecting surface, said system comprising:
    a laser,
    a focusing lens associated with said laser and positioned to direct laser optical energy into a focal saddle, said lens and said surface comprising a specular reflector for the physical condition where said surface is present inside said focal saddle,
    a specular mirror positioned with respect to said lens so that it forms in combination with said lens and said surface a low-Q resonant cavity when said surface is present in said focal saddle,
    means operatively associated with said laser for indicating when said surface is present in said focal saddle, and
    means associated with and responsive to the position of said lens for determining said distance measurement.

2. The system of claim 1 wherein said low-Q resonant cavity encloses a laser active medium having sufficient gain to produce oscillation and said indicating means includes a photo detector responsive to light generated by said laser for providing an electrical output only when said surface of said object is in said focal saddle and said laser is oscillating.

3. The system of claim 1 wherein said low-Q resonant cavity is optically coupled to an oscillating laser and contains a phase modulator driven at a predetermined frequency, and said laser has optically coupled thereto an optical detector responsive to modulation products having said frequency so that the presence in the output of said detector of said frequency indicates that said surface of said object is present in said focal saddle.

4. The system of claim 1 wherein said specular mirror comprises one resonator element in a dual polarization laser, said low-Q resonant cavity is optically coupled by virtue of said specular mirror to said dual polarization laser, said dual polarization laser having sufficient adjacent mode coupling to suppress one mode and containing a quarter wave retardation plate oriented at about 45 degrees with respect to permitted laser modes, and said dual polarization laser has coupled thereto a photodetector preferentially responsive to only one mode so that the presence of said surface of said object and the motion of said object in said focal saddle is indicated by mode changing.

5. A laser distance measuring device for use with an object having diffuse reflection characteristics, said device comprising:
    a laser active medium characterized in having high gain,
    a lens associated with said active medium for focusing light from said medium into a focal saddle region,
    a mirror located on the side of said active medium away from said lens and positioned to act in conjunction with said lens as a low-Q optical resonator when the surface of said object is in said focal saddle region of said lens,
    means for moving said lens along the axis of said resonator relative to said surface, and
    means associated with said laser for indicating when said laser is oscillating.

6. A laser distance measuring device for use with an object having diffuse reflection characteristics, said device comprising:
    an oscillating laser having an optical resonant cavity with at least one partly transmissive mirror,
    a lens associated with said laser for focusing light emitted from said mirror into a focal saddle region, said lens forming in combination with a surface of said object a specular reflector and said specular reflector forming in combination with said mirror a low-Q optical resonant cavity when said surface is in the focal saddle of said lens,
    means for moving said lens axially with respect to said laser and relative to said object,
    a phase modulator located between said lens and said mirror and driven at a predetermined modulating frequency, and
    means for analyzing the energy in said laser for a modulation component at said frequency, the presence of which denotes the location of the surface of said object inside said focal saddle region.

7. A laser distance measuring device for use with objects having diffuse reflection characteristics, said device comprising:
    an oscillating dual-polarization laser having an optical resonator with at least one partly transmissive mirror and sufficient adjacent mode coupling to limit its oscillation to a single polarization at a time,
    a lens associated with said laser for focusing light from said mirror into a focal saddle region,
    means for moving said lens along the optical axis of said laser through said focal saddle and relative to said object, and
    means for detecting changes in the state of polarization of said laser.

8. The device of claim 7 wherein said resonator is translated to change its tuning and to produce polarization changes at a rate related to the speed of said translation.

9. The device of claim 8 further including a phase modulator located between said mirror and said lens and driven at a frequency that is substantially greater than said rate.

* * * * *